US011409903B2

(12) United States Patent
Glazberg et al.

(10) Patent No.: US 11,409,903 B2
(45) Date of Patent: Aug. 9, 2022

(54) PRIVATE AND NON-PRIVATE TASKS IN AUGMENTED REALITY SYSTEMS

(71) Applicant: Shmuel Ur Innovation LTD., Shorashim (IL)

(72) Inventors: Ziv Glazberg, Haifa (IL); Shmuel Ur, Shorashim (IL)

(73) Assignee: SHMUEL UR INNOVATION LTD, Shorashim (IL)

( * ) Notice: Subject to any disclaimer, the term of this patent is extended or adjusted under 35 U.S.C. 154(b) by 463 days.

(21) Appl. No.: 16/597,988

(22) Filed: Oct. 10, 2019

(65) Prior Publication Data

US 2021/0110058 A1 Apr. 15, 2021

(51) Int. Cl.
*G06F 21/62* (2013.01)
*G06T 11/00* (2006.01)
*G06V 40/16* (2022.01)

(52) U.S. Cl.
CPC .......... *G06F 21/6245* (2013.01); *G06T 11/00* (2013.01); *G06V 40/172* (2022.01)

(58) Field of Classification Search
CPC .... G06F 21/6245; G06T 11/00; G06V 40/172
See application file for complete search history.

(56) References Cited

U.S. PATENT DOCUMENTS

| 10,977,869 | B2* | 4/2021 | Hu | A63F 13/65 |
| 2017/0337813 | A1* | 11/2017 | Taylor | G05D 1/0285 |
| 2018/0190032 | A1* | 7/2018 | Barnett | G06T 5/002 |
| 2018/0314484 | A1* | 11/2018 | Pahud | A63F 13/5255 |
| 2019/0370492 | A1* | 12/2019 | Falchuk | G06F 3/04815 |
| 2020/0312005 | A1* | 10/2020 | Desai | G06F 3/1438 |

OTHER PUBLICATIONS

NPL Search Terms (Year: 2022).*
Lebeck, Kiron. Security and Privacy for Emerging Augmented Reality Technologies. Diss. 2019. (Year: 2019).*
Langfinger, Michael, et al. "Addressing security challenges in industrial augmented reality systems." 2017 IEEE 15th International Conference on Industrial Informatics (INDIN). IEEE, 2017. (Year: 2017).*

* cited by examiner

*Primary Examiner* — Syed A Zaidi

(57) ABSTRACT

Method, system and product for performing private and non-private tasks in Augmented Reality (AR) systems. A privacy policy of a user using an AR device is obtained. A frame sensor is utilized to obtain frames for processing. An overlay display for the frame is generated. The overlay display is generated based on an execution of a non-private task on a non-trusted device and based on an execution of a private task on a trusted device. The private task and the non-private task are determined based on the privacy policy. The overlay display is displayed by an AR device.

19 Claims, 9 Drawing Sheets

PRIVATE AND NON-PRIVATE TASKS IN AUGMENTED REALITY SYSTEMS

TECHNICAL FIELD

The present disclosure relates to computer systems in general, and to Augmented Reality (AR), in particular.

BACKGROUND

Currently AR technology has not yet fulfilled the expectations. Lack of Internet Protocols (IP) that can support the high bandwidth and low latency requirements as well as privacy concerns of people are holding wide adoption.

Some AR applications may depend on changing captured images in an augmented reality experience. For example, an AR application may change people's hair, transform cats images to images of dogs, etc. Another set of applications may allow users to watch remote places and feel as if they are standing there, e.g., by filming a remote place from deferent angles simultaneously and creating frames depending on the location and angle of a user who is watching the remote place. Streams from each camera may be sent to a server to compile the different streams and provide streams reflecting different fields of view of each user.

As the consumers of such streams may be mobile and as AR applications may be required to have a large bandwidth and a low latency, Fourth Generation (4G) mobile networks may not fulfill this requirement since they are too slow and have a latency that is not small enough. Fifth Generation (5G) mobile networks may fulfill the connectivity requirements since they have a bandwidth of 10 Giga bits per second (Gbps) and a latency of 1 millisecond.

When the first AR glasses entered the market they drew security and privacy concerns. People feared from being constantly filmed by the AR glasses. People that wore it were banned from several restaurants and even got into fights.

BRIEF SUMMARY

One exemplary embodiment of the disclosed subject matter is a method comprising: obtaining a privacy policy of a user, wherein the user is using an Augmented Reality (AR) device; obtaining a frame from at least one frame sensor; generating an overlay display for the frame, wherein said generating is based on an execution of a non-private task on a non-trusted device and based on an execution of a private task on a trusted device, wherein the private task and the non-private task are determined based on the privacy policy; and displaying, by the AR device, the overlay display.

Optionally, the method further comprises: determining a private portion of the frame, whereby dividing the frame to the private portion and a non-private portion; wherein the execution of the non-private task comprises processing the non-private portion of the frame, whereby obtaining a first overlay; wherein the execution of the private task comprises processing the private portion of the frame, whereby obtaining a second overlay; wherein said generating the overlay display further comprises: merging the first overlay and the second overlay to obtain the overly display.

Optionally, said determining the private portion of the frame is based on a point of fixation of the user, wherein the non-trusted device is unable to ascertain the point of fixation of the user from the non-private portion.

Optionally, said determining the private portion of the frame is based on an identification of Personally Identifiable Information (PII) appearing in the frame.

Optionally, the PII comprises visible facial features of a person, whereby the non-private portion excludes the visible facial features.

Optionally, the method further comprises: determining a peripheral portion of the frame based on a point of fixation of the user; wherein the non-private task is configured to determine a high-resolution overlay of the frame; wherein the private task is configured to obtain a low-resolution overlay of the peripheral portion of the frame; and wherein the overlay display for the frame comprises the low-resolution overlay of the peripheral portion of the frame and at least a portion of the high-resolution overlay of the frame.

Optionally, the trusted device comprises the AR device, wherein the non-trusted device comprises an external device, external to the AR device.

Optionally, the trusted device comprises a trusted server, wherein the non-trusted device comprises a non-trusted server.

Optionally, the non-trusted device comprises the AR device.

Optionally, the execution of the private task comprises: analyzing the frame to determine a private portion of the frame and a non-private portion of the frame; and providing the non-private portion of the frame to the non-trusted device, whereby the non-trusted device performing the execution of the non-private task with respect to the non-private portion of the frame.

Optionally, the execution of the private task further comprises: obtaining a first overlay from the non-trusted device, wherein the first overlay is generated by the execution of the non-private task; executing one or more skins on the private portion of the frame, whereby generating a second overlay; and merging the first overlay with the second overlay, whereby generating the overlay display.

Optionally, the overlay display is determined by applying skins on the frame or a portion thereof; based on the privacy policy, identifying, in the skins, one or more private skins and one or more non-private skins; wherein the execution of the non-private task comprises applying the one or more non-private skins, whereby obtaining a first overlay; and wherein the execution of the private task comprises applying the one or more private skins, whereby obtaining a second overlay; wherein said generating further comprises combining the first overlay and the second overlay, whereby generating the overlay display.

Optionally, the execution of the non-private task further comprises applying the one or more redundant skins, wherein the private task comprises ignoring output of the one or more redundant skins.

Optionally, said applying the one or more private skins is performed on a first object in the frame, wherein the execution of the non-private task comprises applying the one or more private skins on a second object in the frame.

Another exemplary embodiment of the disclosed subject matter is an Augmented Reality (AR) system comprising: an AR device having an AR display; a memory configured to retain a privacy policy of a user of the AR device; and a processor configured to: determine a trust score for each execution environment of one or more execution environments; based on the trust score of an execution environment and based on the privacy policy, determine a set of skins to be executed by the execution environment; generate overlay displays corresponding frames, wherein the frames are obtained by a frame sensor, wherein the overlay displays are generated, at least in part, by utilizing the execution environment to apply the set of skins on the frames; and display the overlay displays using the AR display.

Optionally, said determining the set of skins comprises excluding one or more skins from being executed by the execution environment due to the trust score being below a threshold.

Optionally, said determining the set of skins comprises determining to apply a first set of skins with respect to a first execution environment having a first trust score above a threshold and determining to apply a second set of skins with respect to a second execution environment having a second trust score below the threshold.

Optionally, said determining comprises for each skin of a plurality of skins, determining an execution environment out of the one or more execution environments to apply the each skin, wherein said determining the execution environment to apply is based on the privacy policy and the trust scores of the one or more execution environments.

Optionally, the execution environment is characterized by a communication channel from the AR system to the execution environment, wherein the trust score of the execution environment is determined based on a trust score of the communication channel.

Optionally, the execution environment is characterized by a controlling entity having control of the execution environment, communication channel from the AR system to the execution environment, wherein the trust score of the execution environment is determined based on a trust score of the controlling entity.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
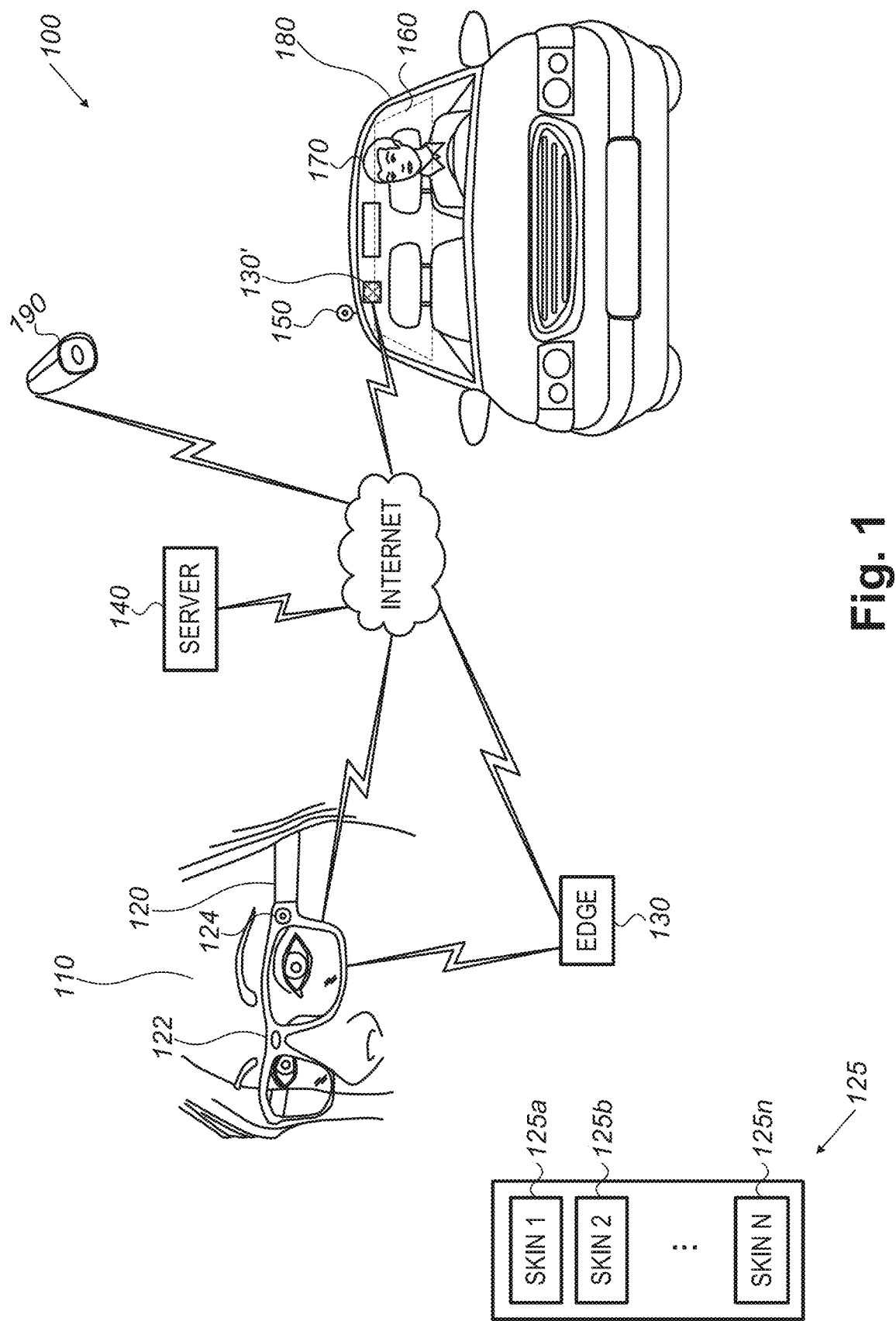
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to provide an augmented reality experience to a user while utilizing computational power of computerized devices while hiding sensitive information from a non-trusted computerized device. In some exemplary embodiments, there may be several options for processing visual information, for executing skins, or the like. In some exemplary embodiments, a skin may be an application, a software, or the like. A skin may be configured to provide an AR overlay for an AR system, AR device, or the like, to be used to construct an AR view for the user. In some exemplary embodiments, a skin may be configured to process a portion of a frame, an object comprised by the frame, or the like. A skin may be applied locally, applied on an edge server, applied on a remote cloud server, or the like. In some exemplary embodiments, an AR device, such as AR glasses, a Virtual Retinal Display (VRD), or the like, may be owned and controlled by the user, as opposed to other external devices which are not owned or controlled by the user. As a result, the AR device may be considered as the most trusted device. The AR device may be configured to use an edge device, a cloud server, or the like in order to harness their additional resources, such as computational power and energy. As the user may not have control over the external devices, it may be desired desirable to limit the amount of information that is shared with such devices. However, it is noted that in some cases, the trustiness property of a device may differ based on the context. For example, an AR device that is lent to the user by third parties may be considered a non-trusted device. An edge device that is owned by the user, such as an edge device installed in his car or in his home or a mobile device acting as an edge device, may be considered as a trusted device, while an edge device installed in a rental car, in a hotel room, in a shopping mall, or the like, may be considered as a non-trusted device. As another example, the trustiness property of the cloud server may differ. In some cases, the user may trust the cloud server as it is owned and controlled by a company that he trusts, even more so than an edge device controlled by a third party. In other cases, the cloud server may not be trusted. In some cases, different amount of information may be exposed to a same third party depending on different governing laws. For example, in a territory where the government respects the privacy of citizens, more information may be exposed than in a territory where the government has control and is able to force the third party to reveal privately-held confidential information.

In some exemplary embodiments, the sensitive data may comprise images that are being captured by a frame sensor that is operationally coupled with the AR device. The sensitive images may comprise images of faces, children, confidential documents, places such as security zones, or the like.

Additionally or alternatively, the sensitive data may comprise the skins that a user is using. As an example, a married woman may use a dating skin. She may wish to hide the usage of the skin and to prevent it from being executed on an external device.

Additionally or alternatively, the sensitive data may comprise metadata determined by the AR framework or by applied skins. For example, using facial recognition, identities of bystanders may be ascertained. The facial recognition may be applied by the AR framework itself or by a specific skin. The information regarding the identity of the bystander may be retained in metadata within the AR framework for future processing. The exposure of the metadata to non-trusted devices may be limited, such as to prevent a wife from learning the identity of her husband's mistress.

Another technical problem dealt with by the disclosed subject matter is to utilize information about the field of view of the user, while avoiding sharing, directly or indirectly, such information with a non-trusted device. In some exemplary embodiments, an AR device may be configured to monitor, e.g., using a sensor, an eye tracking device, a camera, an infrared camera, or the like, the point of fixation of the user. The AR device may be configured to utilize field of view information in preparing the AR display. For example, in order to decrease power consumption of the AR display, resolution of the AR display may be reduced in the areas of a frame that are outside the point of fixation of the user, or are captured by the peripheral vision of the user. As another example, in some cases, objects that are not in the point of fixation of the user, may not be processed by skins. As an example, a skin may analyze people and provide additional information about that person, such as name, position, or the like. It may be desired to only process people that the user is looking at—e.g., within the user's focal point. Although the eye tracking information may be useful and required for such processing, the user may wish to guard his privacy and avoid sharing such information. As an example, a user may be watching a football with her spouse. She may not wish to reveal that she was looking at the coach the entire match. As yet another example, a person looking at a crowd, may not wish to share with third-parties the fact that he is looking at a woman's boozem.

One technical solution is to break the operation of providing an augmented reality experience to a user to a private task and to a non-private task. The non-private tasks may be executed by a non-trusted device, the private task may be executed by a trusted device. An overlay display that may comprise the output of a private task or of a non-private task may be generated and presented to a user. In some exemplary embodiments, determining the private task and the non-private task may be based on a privacy policy. As an example, the privacy policy may comprise a restriction requiring executing a skin that is configured to identify faces, on a trusted device. The private task may comprise applying the skin, and such private task may be executed by a trusted device, such as an edge server, the AR device, or the like. Additionally or alternatively, the non-private task may comprise executing other skins on non-trusted devices. As yet another example, the privacy policy may comprise a restriction on portions of the frame that are conveyed to non-trusted devices. The privacy policy may require redaction of a content of any visible document having a predetermined marking, such as a "CONFIDENTIAL" marking thereon. The private task may identify confidential content and remove such content from a frame before transmitting the frame to be processed (e.g., by applying skins thereon) by a non-trusted device. As yet another example, the privacy policy may indicate for a target skin, properties of objects that are to be processed only by trusted devices. The private task may accordingly identify for each object to be processed by the target skin, whether it complies with the properties defined in the privacy policy. If the object is to be processed by trusted devices only, the target skin is applied on the object by a trusted device. The target skin may be applied on other objects using non-trusted devices.

In some exemplary embodiments, The AR framework may obtain frames from at least one frame sensor. In some exemplary embodiments, the private task and the non-private task may be executed, such as with respect to the frames. The AR framework may obtain an overlay display. In some exemplary embodiments, obtaining the overlay display may comprise obtaining a first overlay, which may be the output of the non-private task. Additionally, or alternatively, obtaining the overlay display may comprise obtaining a second overlay which may be the output of the private task. Additionally, or alternatively, obtaining the overlay display may comprise merging or otherwise combining the first overlay and the second overlay. The overlay display may be displayed to the user using the AR device, providing the user with an AR experience.

In some exemplary embodiments, a private portion of the frame may be determined. The private portion of the frame may be determined based on an identification of Personally Identifiable Information (PII) appearing in the frame. The PII may be information that may be used in order to trace the user, identify the user, or the like. As an example, the PII may comprise visible facial features of the user (e.g. when looking at a mirror). Additionally, or alternatively, the PII may comprise visible facial features of a person. The person may be the users' siblings, images of the users' parents, images of the users' spouse, or the like. In some exemplary embodiments, the non-private portion of the frame may be obtained by excluding the private portion of the frame from the frame. In some exemplary embodiments, obtaining the non-private portion may comprise deleting the private portion, such as by overwriting pixels thereof. Additionally, or alternatively, the private portion may be removed and pixel values thereof may not be provided as part of the non-private portion.

In some exemplary embodiments, executing the private task may comprise processing the private portion of the frame. As a result from determining the private portion of the frame, the frame may be divided to a private portion and a non-private portion. In some exemplary embodiments, executing the non-private task may comprise processing the non-private portion of the frame. In some exemplary embodiments, the AR device may merge the first and second overlays in order to generate an overlay display that is displayed to the user. As an example, the private portion of the frame may be determined based on the field of view of the user. The non-private portion of the frame may be the frame without the private portion. In some exemplary embodiments, the portion in the frame that is being watched by the user, constituting the private portion, may be processed by the private task on a trusted device such as on the AR device, on a trusted cloud server, on a trusted edge server, or the like. Additionally, or alternatively, the non-private portion of the frame, that is not being watched by the user may, may be processed by the non-private task on a non-trusted device.

In some exemplary embodiments, it may be desired to save power by downscaling the overlay display in the peripheral portion of the frame. Additionally, or alternatively, it may desired to hide from a non-trusted device the non-peripheral portion of the frame, at least by not disclosing is the non-peripheral portion of the frame. In some exemplary embodiments, based on the field of view of the user, a peripheral portion of the frame may be determined. The non-private task may be configured to determine a high-resolution overlay of the frame. Additionally, or alternatively, the non-private task may be configured to determine a high-resolution overlay and a low-resolution overlay of the frame. Additionally, or alternatively, the private task may be configured to obtain a low-resolution overlay of the peripheral portion of the frame. In some exemplary embodiments, upon obtaining a high-resolution overlay of the frame, the AR device may downscale a portion of the overlay corresponding to the peripheral portion of the frame. Additionally, or alternatively, the AR device may use the output of the private task, the second overlay that may be a low resolution overlay of the peripheral objects of the frame and merge it with the first overlay.

In some exemplary embodiments, a portion of the metadata may not be sent to a non-trusted device. The metadata may comprise data such as people that are with the user, the location of the user, the point of fixation the user, or the like. A private task may be considered as private due to comprising private metadata. By not sending the metadata the private task may become a non-private task, allowing to utilize resources of a non-trusted device.

In some exemplary embodiments, an AR system may determine a set of skins to be executed. A skin may require a computerized device having a trust above a predetermined threshold to be applied thereon. In case that there are no computerized devices having a trust score that is above the threshold, the AR system may exclude that skin from the set of skins.

One technical effect of utilizing the disclosed subject matter is to exploit computational resources external to the AR device while keeping the privacy of the user. In some exemplary embodiments, the AR device may use a battery and it may be desired to save electrical power by executing some tasks on another device. Additionally, or alternatively, the AR framework may be configured to execute tasks requiring a large amount of computational power. Hence, it may be desired to execute some tasks on another computerized device. The disclosed subject matter may be used to determine the private task and the non-private task, to determine another computerized device to execute the tasks thereon in order to save battery power and execute CPU intensive tasks while keeping the privacy settings.

Another technical effect of utilizing the disclosed subject matter is to exploit a trusted network and a non-trusted network based on privacy settings. In some exemplary embodiments, an AR device may be able to connect both to a private network and to a non-private network, such as a private WiFi and a public cellular network. The AR device may utilize the private network in order to send private data to be processed by a private device and the non-private data to be processed by a non-trusted device.

Referring now to FIG. 1 showing an environment, in accordance with some exemplary embodiments of the disclosed subject matter. Environment 100 may be an environment where an AR framework is implemented. The AR framework may be a framework for providing augmented reality experience to a user, by executing skins. Skins and AR frameworks are disclosed, inter alia, in U.S. Pat. No. 9,865,088, entitled "Evaluation of Augmented Reality Skins", dated Jan. 9, 2018, U.S. Pat. No. 9,953,462, entitled "Augmented Reality Skin Manager", dated Apr. 24, 2018, U.S. Pat. No. 9,990,772B2, entitled "Augmented reality skin evaluation", dated Jun. 5, 2018, and U.S. Patent Application Publication 2016/0,240,005, entitled "Subject selected augmented reality skin", dated Aug. 18, 2016, all of which are incorporated herein by reference in their entirety without giving rise to disavowment.

Environment 100 may comprise a Person 110. Person 110 may be wearing AR Glasses 120. AR Glasses 120 may comprise a frame sensor such as Camera 124 for capturing images that are processed by the AR framework. Lenses of the AR Glasses 120 may be configured to display an overlay display that is seamlessly interwoven with the physical world as perceived by Person 110, such as by adding layers over perceived objects, modifying perceived objects, removing perceived objects, or the like.

In some exemplary embodiments, AR Glasses 120 may comprise Signaling Module 122. Signaling Module 122 may be a LED providing a visual signal, a speaker, a wireless transmitter providing a signal using radio frequency, or the like. Signaling Module 122 may be configured to provide a signal indicative of the restriction being imposed by the AR framework. In some exemplary embodiments, other persons may perceive the signal and be aware that a restriction is imposed by the AR framework. Additionally or alternatively, a computerized device may be configured to perceive the signal indicating that the AR framework is imposing a restriction. In some exemplary embodiments, Signaling Module 122 may provide a signal that cannot be perceived by a person, such as in an audio frequency that is not within a human hearing range, a visual indication in an infrared light invisible to the human eye, or the like.

Environment 100 may comprise a Car 180. Car 180 may be driven by a Person 170. Car 180 may comprise a Frame Sensor 150. Frame Sensor 150 may be associated with the field of view of Person 170.

Car 180 may comprise an AR Display 160 embedded within the windshield of Car 180. An AR framework may display the overlay display using AR Display 160, so as to provide an augmented display of the physical world. In some exemplary embodiments, frames from Frame Sensor 150 may be analyzed by the AR framework, which may generate overlay display to be presented using AR Display 160.

In some exemplary embodiments, Skins 125 may be utilized to provide the augmented display. Skins 125 may comprise a plurality of skins, e.g., Skin 125a, Skin 125b, and Skin 125n, or the like, each of which configured to analyze the frame or portion thereof and provide an overlay display thereon. The overlay displays may be combined, on top of each other, to provide the final overlay display that is presented to the user (e.g., Person 110, Person 170) to provide augmented reality experience. In some exemplary embodiments, the AR framework may be configured to analyze the frame, identify objects therein, invoke the Skins 125 or portion thereof, collect output therefrom, and provide the final output for display. In some exemplary embodiments, the AR framework may be configured to invoke a skin, schedule an invocation of a skin, determine the order in which skins are invoked, determine which execution environment would execute each skin, or the like.

Environment 100 may comprise an Edge 130. Edge 130 may comprise a processor, a receiver, a transmitter, a memory, or the like. Edge 130 may be a computer, a smartphone, or the like. Similarly, an Edge 130' may be an edge computer that is installed within Car 180. Additionally, or alternatively, Edge 130' may be a smartphone of Person 170, the infotainment system of Car 180, or the like. Edges 130, 130' may be utilized by the AR framework to execute one or more skins. In some exemplary embodiments, Edges 130, 130' may constitute an execution environment for executing skins. Edges 130, 130' may communicate with the AR framework, or components via a computerized network.

Environment 100 may comprise Server 140. Server 140 be a remote cloud server and/or any other network server. In some exemplary embodiments, Server 140 may be configured to obtain information from the AR framework, execute a skin, provide the output of the skins to the AR framework, or the like. Additionally, or alternatively, Server 140 may be utilized by the AR framework to execute one or more skins. In some exemplary embodiments, Server 140 may constitute an execution environment for executing skins.

Environment 100 may comprise Frame Sensor 190 that is external to AR Glasses 120 and to Car 180. Frame Sensor 190 may be associated with the field view of Person 170 or Person 120. Frame Sensor 190 may transmit frames to Edge 130, 130' or to Server 140. An AR framework may utilize frames sent from Frame Sensor 190, such as to augment the display of the user, to identify objects to be analyzed, or the like.

In some exemplary embodiments, the AR device, such as AR Glasses 120, AR Display 160, or the like, may be connected to an edge computer, such as Edges 130, 130', and to cloud server, e.g., Server 140. The edge computer, however, may be closer to the AR device than the cloud server, such as having a reduced latency thereto, requiring reducing power consumption to reach it, or the like. For example, the edge computer may be directly connected, such as using a Bluetooth connection, using WiFi connection, using local cellular connection, or the like. Additionally, or alternatively, the edge computer may be connected to a same Local Area Network (LAN) as the AR device, may be physically connected thereto using a cabled connection, or the like. In some exemplary embodiments, communication to Server 140 may be provided through a Wide Area Network (WAN), through the Internet, or the like. For example, Server 140 may be a cloud computing platform that is used by various AR devices that are located remotely therefrom and from one another.

In some exemplary embodiments, different execution environments may have different resources. For example, Server 140 may have more computational resources, memory resources, or the like than Edge 130. Additionally, or alternatively, each execution environment may have different power resources. The AR device, such as AR Glasses 120 may have limited power supply. Additionally, or alternatively, Edge 130, which may be implemented by a mobile device, may also have limited power supply. Additionally, or alternatively, different execution platforms may retain, locally, or have connectivity to, different data storages. For example, a database used for identifying a person using facial recognition may be retained on Server 140. AR Glasses 120 may have limited memory capacity and may be able to retain only a portion of such database, such as a portion comprising frequently identified persons, people who are known to be at the same location, people that are deemed VIPs for the user, or the like. As a result, it may be desired to perform some computations off-device, on Edge 130 or on Server 140. As an example, Skin 125a may be executed on AR Glasses 120, Skin 125b may be executed on Edge 130 and Skin 125n may be executed on Server 140. In some exemplary embodiments, each skin may receive, as input, the output of the previous skin, in accordance with an order of execution, so as to add a layer on top thereof. As an example, Skin 125a may add an image of a cat, and Skin 125b may process the image of the cat and modify its appearance. The AR framework may be configured to invoke execution of each skin, in accordance with predetermined rules and based on the content of the frame, to select for each skin an execution environment, to gather input for the skin and obtain the output of the skin, and generate the final overlay display to be displayed by the AR device.

Figure 2:
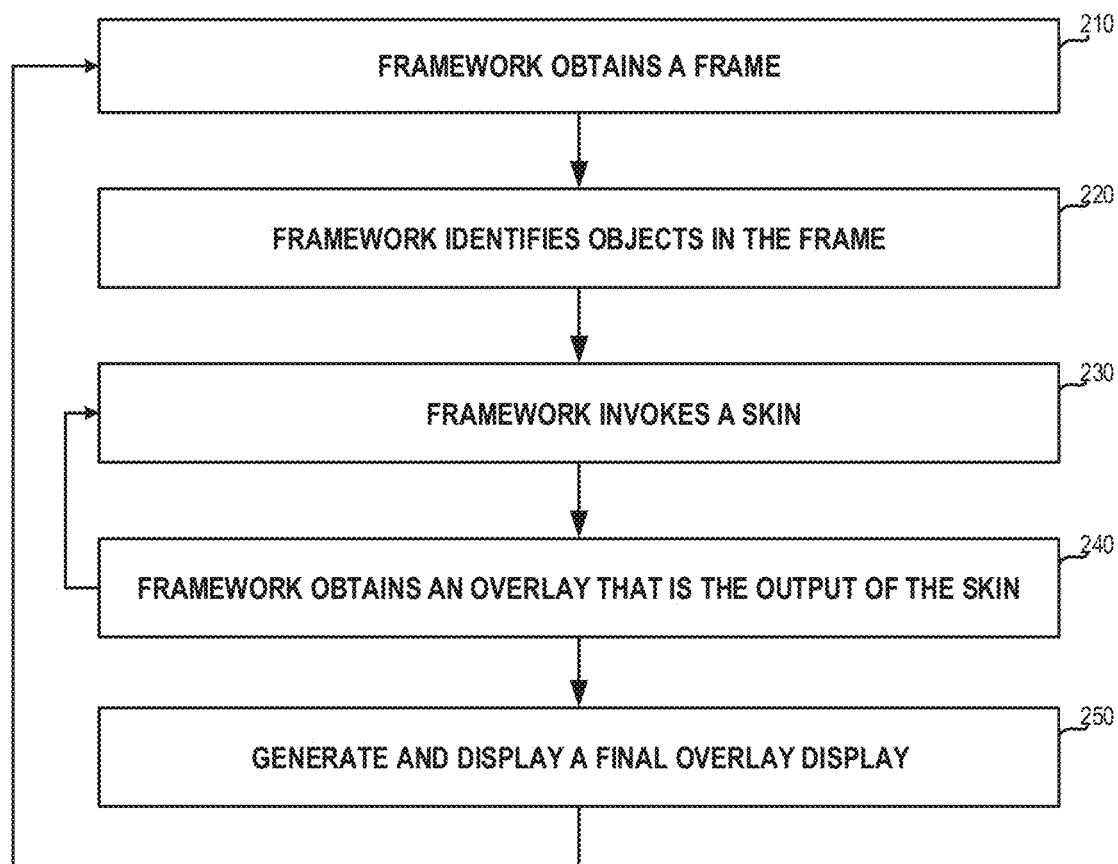
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, the framework obtains a frame. The frame may be obtained by a frame sensor, such as camera, that may be operatively coupled with the framework. The frame may be obtained directly from a frame sensor that is associated with a view of a user, such as a camera embedded in AR glasses (e.g., 124 of FIG. 1). Additionally or alternatively, the frame may be obtained from a computerized environment such as an edge device, a remote cloud server, or the like. Additionally or alternatively, the frame may be obtained from an external frame sensor, such as 190 of FIG. 1, that may be utilized to capture information that may be obscured and blocked from the view of the user. In some exemplary embodiments, images may be obtained from a plurality of sources and may be integrated together to create the frame.

On Step 220, the framework identifies objects that are in the frame. The framework may be configured to identify objects using algorithms such as Regions Convolutional Neural Network (RCNN), Faster RCNN, Scale-Invariant Feature Transform (SIFT), template matching, edge matching, or the like. In some exemplary embodiments, each skin may register on one or more object type. In some exemplary embodiments, in order to improve performance, the framework may only try to identify objects on which at least one skin is registered. As an example, in case that skins are registered on objects of type "face" and "hat", the framework may skip large objects such as a car, a house, or the like. In some exemplary embodiments, the framework may analyze the frame and maintain a metadata record representing the frame identifying each object appearing in the frame. Additionally or alternatively, the metadata may be indicative to the surrounding of the user, to people that may be with the user, or the like.

On Step 230, the framework may invoke a skin. The framework may hold a list of available skins and corresponding objects and pull information regarding the faces from a social network database. The woman may enter a nudist beach. At the entrance to the nudist beach, there may be a marker signaling to the AR glasses not to perform facial recognition. The AR framework may embed that restriction in a metadata. The skin may obtain the metadata and pause its operation until the restriction is lifted. In some exemplary embodiments, the skin may unregister from the objects in the AR framework, and register for a notification from the AR framework when the altered functionality is lifted. Upon receiving such a notification, the skin may re-register on the objects of interest. As a result, performance improvement is achieved as the skin is never invoked when it is unable to perform its intended operation due to the marker-related instructions. Additionally or alternatively, the AR framework may manage the unregistration and registration of pertinent skins, instead of the skin itself unregistering and re-registering itself.

On Step 240, the framework obtains an overlay that is the output of the skin. In some exemplary embodiments, in case that the skin was not executed locally (e.g. executed on an edge computer, on a cloud server, or the like), the overlay may be obtained therefrom via a communication channel. In some exemplary embodiments, the skin may be executed locally as function. The overlay may be the output of the function. Additionally or alternatively, the skin may be executed remotely. The overlay may be provided to the AR framework as a stream. Additionally or alternatively, the overlay may comprise a bitmap image and a bitmap mask. The bitmap image may comprise the content of the pixels to be drawn, while the bitmap mask may comprise a corresponding bitmap, where each cell corresponds to a bit. The value of the bit in the bitmap mask may indicate whether or not the value of the overlay is to be used. As an example, consider a frame f, an overlay bitmap image, o, and a mask, m. For each pixel (x,y), the output value (out) representing the AR final display may be computed as $dis(x,y)=o(x,y) \cdot m(x,y)+f(x,y) \cdot (1-m(x,y))$. The overlay display (od), however, may be computed as $od(x,y)=o(x,y) \cdot m(x,y)$. Bitwise operations may be performed on the bitmasks, such as dis=(o AND m)XOR (f AND ¬m), and od=o AND m. In some exemplary embodiments, the mask may be either 0 (do not use the overlay bit) or 1 (use the overlay bit). Additionally or alternatively, values in between 0 and 1 may be used to provide for opaqueness and transparency properties.

In some exemplary embodiments, the overlay may be an image in the size of the frame. As the AR framework may combine the overlay with the frame, the overlay may comprise certain pixels from the output of the skin and transparent pixels when no skin output is received for a certain location in the frame. Additionally or alternatively, the overlay may comprise an image that may be the output of the skin and its relative position in the frame. In some exemplary embodiments, the overlay may comprise information regarding the importance the position of the skin output in the frame. As an example, an informative skin that adds labels to objects may be agnostic regarding the position of the label. Additionally or alternatively, a skin that adds lipstick may configured to set its location requirement to a high and/or maximal score, e.g., such as "high", "1", or the like.

In some exemplary embodiments, if the view of the AR device is shared, the overlay display may be overlaid over the frame to generate the AR frame, which represents the view that is perceived by the user using the AR device.

In some exemplary embodiments, Steps 230-240 may be performed iteratively, while invoking different skins, until all skins that are registered on available objects are invoked. In some exemplary embodiments, an overlay is obtained from one skin, incorporated into the frame and potentially provided to the next skin that processes the affected area. Additionally or alternatively, the overlays may be combined with one another, and maintained separately from the frame itself. The skins may receive the frame and the combined (previous) overlays. Additionally or alternatively, the skins may receive an augmented frame, comprising the frame and combined (previous) overlays, for processing.

On Step 250, the final overlay display that is generated, based on the combined overlays of the invoked skins, may be displayed. It is noted, that the overlay is seamlessly interwoven with the physical world, which is represented by the original frame of Step 210. As a result, the overlay display is overlaid over the physical world, without combing the frame itself.

In some exemplary embodiments, an AR framework may be operatively coupled with one or more frame sensors. The frame sensors may produce a stream of frames. The AR framework may obtain the streams. In the case that there are several frame sensors, the AR framework may combine multiple streams of frames into a single stream. In case that a skin is registered on types of objects that the single stream comprises, the AR framework may apply the skin on an appropriate object for each frame. In some exemplary embodiments, steps 210-250 may be repeated.

In some exemplary embodiments, a user may configure the AR framework to execute a skin at a specific location, for a specific time duration, or the like. As an example, a user may be using his AR glasses constantly. When he enters the supermarket, a skin that shows prices of products may be added to the list of active skins and may be invoked as long as the user is in the supermarket. When the user leaves the supermarket, the skin may be deactivated. In some exemplary embodiments, activation or deactivation may be configured to occur when a marker is identified, as explained hereinbelow. Additionally or alternatively, upon identifying a marker, a suggestion to activate a skin may be presented to the user and the user may confirm or reject the suggestion. In some cases, the user may set his personal preferences for activation or deactivation of skins, such as based on identifying markers, based on his location, based on a context, based on a time of day, based on a social environment in which he his located, or the like.

Figure 3:
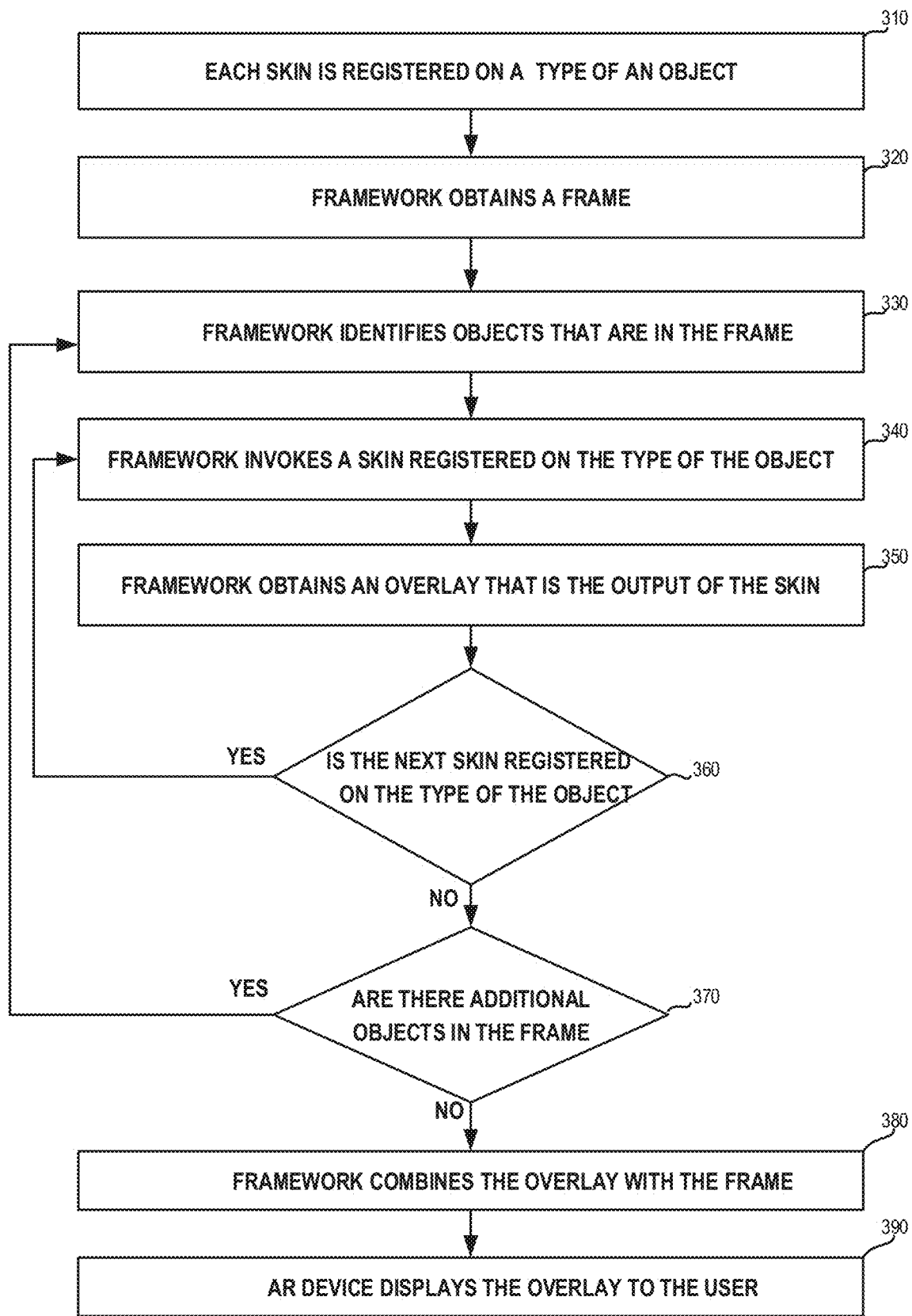
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, each skin is registered on a type of an object. In some exemplary embodiments, each skin may register with the AR framework to receive notification and handle specific types of objects. An object appearing in the frame may be identified and classified to a type. The AR framework may support a variety of objects types, such as but not limited to a person, an animal, a house, a road, a plant, a tree, a face, an eye, or the like. In some exemplary embodiments, an object may be classified as having a plurality of object types, such as objects that are an abstraction or instantiation of one another (e.g, a police officer may be an instantiation of an abstract person type), objects that have more than one attribute corresponding to an object type (e.g., a person may be both an adult, a female and a Caucasian), or the like. In some exemplary embodiments, an object may comprise other objects. As an example, an object of type person may comprise objects of type face, eyes, arms, clothes, or the like.

On Step 320, the AR framework obtains a frame. The frame may be obtained from a frame sensor such as a camera that is embedded in an AR Glasses, from a camera that is embedded in a mobile phone, from a surveillance camera, from a thermographic camera, from an infrared camera, or the like. The frame sensor may capture one frame after the other and produce a stream of frames. The frame sensor may obtain frames that may be processed to generate output overlays for the frames in a rate such as 90 Frames per Second (FPS), 60 FPS, or the like. In some exemplary embodiments, a rate which is lower than 60 may result in a quality which may be poor for human users.

The AR framework may obtain a frame from a frame sensor and may send the frame, transmit the frame, save the frame, or the like for future processing. In some exemplary embodiments, the AR framework may obtain several frames from multiple sources in a single time unit and merge the frames to a single frame prior to processing the frame. As an example, the AR framework may not have access to a frame as viewed from the field of view of the user. Using a plurality of cameras, several different images may be transformed and merged together to provide an estimated frame of the view of the user. The image of the room or of the person may be taken from several image sensors. Frames from different image sensors may be merged to a single frame.

On Step 330, the AR framework identifies objects that appear in the frame. The AR framework may employ object recognition, computer vision techniques, Artificial Intelligent (AI) algorithms, or the like, to identify the objects in the frame. Additionally or alternatively, metadata about objects may be available in other manners, such as using wireless transmission, RFID, consultation with 3D maps, or the like.

In some exemplary embodiments, the AR framework may classify the objects to types and may build a list comprising the types of the objects that comprised by the frame. In some exemplary embodiments, the AR framework may create or maintain a metadata record. The metadata record may be updated to comprise each identified object and properties thereof. For example, the metadata record may indicate for an object its type, its location in the frame, its dimensions, or the like. In some cases, skins that are executed by the AR framework may access the metadata record, utilize its content, and potentially update it.

In some exemplary embodiments, an object may not have existed in the frame as captured by the frame sensor. A skin may process the frame or portion thereof, and add an object record to the metadata record to indicate the existence of the new object, to ensure it is processed correctly. As an example, a skin may add a label to be presented near an existing object, a skin may add an object of a cat, a navigation skin may add a graphical representation of a route on top of the road, or the like. As another example, the AR framework may add images of family members of a person that is shown in a frame, a garden near a house, or the like.

On Step 340, the AR framework invokes a skin which is registered on the type of the detected object in the frame. As each skin may have registered on types of objects which are of interest to it (e.g., Step 310), the AR framework may invoke only skins that have objects of interest in the frame to avoid having each skin determine, dynamically, whether objects of interest appear in the frame, requiring resource consumption, such as energy and processing resources.

In some exemplary embodiments, the AR framework may be executed by a device, such as but not limited to the AR device (e.g., AR Glasses 120) itself, an edge computer (e.g., Edge 130, 130' of FIG. 1), a server (e.g. Server 140 of FIG. 1). In some cases, each skin may be executed on a different device, for example, on an AR device (e.g., AR Glasses 120 of FIG. 1), on an edge computer (e.g., Edges 130,130' of FIG. 1), on a server (e.g., Server 140 of FIG. 1), or the like. The AR framework may invoke the skin on the relevant computing environment to process the objects of interest. As an example, the skin may begin execution upon a command of the AR framework. As another example, the skin may be executed by a daemon process that pre-exists and begins processing in response to a command from the AR framework. In some cases, if several skins are registered on the same object, the AR framework may invoke them one after the other.

In some exemplary embodiments, the AR framework may provide the invoked skin with a frame, a portion of the frame (also referred to as a "sub frame" or "patch"), or the like. In some exemplary embodiments, the AR framework may provide the skin with the sub frame that consists of the object of interest. If several objects appear, the AR framework may invoke the skin a plurality of times, each of which with a different sub frame. Additionally or alternatively, the AR framework may provide the skin with the metadata of the object, for accessing and potentially for updating. For example, if the skin performs facial recognition, the skin may update the metadata properties of the object to indicate the identified person of the object. Other skins that perform facial recognition may avoid performing facial recognition and rely on the output of a previous skin. Additionally or alternatively, the output of the previous skin may be verified prior to being relied upon.

Additionally or alternatively, the AR framework may provide the skin as an input an editable section of the frame. The editable section may be an area in the frame or patch on which the output of the skin may be drawn.

Additionally or alternatively, the input provided to the skin may comprise the metadata record. The metadata record may comprise data such as a list of objects that are in the frame or patch, properties of the objects, coordinates on which the skin is allowed to draw on, the context in which the frame was taken, properties regarding the person using the AR device, or the like. In some exemplary embodiments, a context of the frame may comprise the location in which the frame was taken, information about the location (e.g. a private house, a work place, information from Geographic Information System (GIS), or the like), the date in which the frame was taken, data regarding the date (e.g. a birthday, an anniversary, or the like), data regarding the frame sensor used to obtain the frame, or the like.

In some exemplary embodiments, the skin may modify the object in a constructive manner, such as by augmenting the object with additional objects, decorations, ornaments, or the like. Additionally or alternatively, the skin may modify the object in a destructive manner, such as painting over the object to remove the object, replacing the object by another object, or the like.

In some exemplary embodiments, the skin may provide an output. The output may comprise an overlay to be displayed over the frame or patch, as determined by the skin. As an example, a skin may add a balloon to appear in a hand of a child. The output may thus by an overlay that, when applied over the frame, adds the balloon at the determined location. As another example, a skin may add a green line on a road, indicating a route on the road. In that case, the output of the skin may be provided using a set of coordinates and a corresponding color, defining the overlay implicitly. As yet another example, the output of the skin may comprise a label with text comprising information about the input object.

Additionally, or alternatively, the skin output may comprise the metadata record. In some cases, the metadata record may be updated by the skin to add information gathered by the skin to existing objects, to add new objects (e.g., the balloon added in the example above), or the like. Additionally, or alternatively, the metadata record may comprise painting instructions to be implemented by the AR framework. As an example, if a skin paints a label before having the final augmented frame, labels may be positioned in a sub-optimal location, such as in a distribution that is too dense, blocking important objects or other visual information, or the like. The skins may add instruction for the AR framework to add labels to objects, such as a name near a person, a material of a structure near the structure, a price tag near a merchandise, a speed indication near a windshield, or the like. After all the skins are executed, and after the overlay display is generated (Step 380), the AR framework may determine the location, size, and other visual properties of the labels, and draw them, to add an additional overlay layer, referred to as a label overlay.

In some exemplary embodiments, the metadata record outputted by the skin may be the updated metadata record. Additionally, or alternatively, the metadata record may comprise the added information only, so as to allow the AR framework to modify the metadata record accordingly at its discretion.

On Step 350, the AR framework obtains an overlay that is the output of the skin. In case that the skin is being executed in the same apparatus as the AR framework, the overlay may be pointed by a pointer that was the input of the skin, or the like. In some exemplary embodiments, the skin may be executed on a different execution platform, such as an edge computer, a server, or the like. The remote platform may send, transmit, or the like, its output as a stream to the AR framework. Additionally or alternatively, the executing platform may store the output of the skin on a local storage device, on a remote cloud server, or the like. The AR framework may access the medium on which the output of the skin is retained and pull the overlay.

In some exemplary embodiments, the skin may output the first overlay followed by outputting updates when its output changes. Each output beside the first overlay may be the delta from the previous output.

As explained above, in some cases, labels may be added at a later stage, allowing other objects to be drawn, as the location of the label may be less important compared to the location of other objects. As an example, in some cases, the label may be drawn far from the object it is associated with and connected thereto using an arrow, a line, or the like. As an example, a label with information about an historical place may be above, below, on the left or on the right of the image of that place. The AR framework may determine the exact location of the label, its size, and other graphical properties after the overlay display is generated.

On Step 360, it may be determined if there is another skin that is registered on the same type of object. If so, Steps 340 and 350 may be performed again with the respect to the next skin, which may process the same objects. Otherwise, Step 370 may be performed.

On Step 370, in case there is another object in the frame that was not yet processed, Steps 330-360 may be repeated with respect to the additional object. As a result, the AR framework may iterate over each object that is in the frame and invoke skins thereon. Otherwise, Step 380 may be performed.

It may be noted that in some cases, skins may be executed in parallel. In some cases, skins that are registered on different types of objects may be executed in parallel to reduce overall computation time. In some cases, a first skin may be registered on a first type of object before a second skin. The second skin may also be registered on another type of object. The first skin may process an object of the first type in parallel to the second skin processing an object of the second type. After the first skin completes its processing, the second skin may process the object of the first type. As another example, if there are a plurality of objects of the first type, the first skin may process the first object, provide an output for the second skin to process the first object sequentially. While the second skin processes the first object, the first skin may continue to process, in parallel, a next object of the same type, creating a pipeline between the first skin and the second skin. In some exemplary embodiments, parallel execution may be performed on different execution platforms. Additionally or alternatively, parallel execution may be useful to reduce latency which may be caused by extra processing time. In some cases, the final output may be provided within a target time, so as to enable an output display stream at a desired rate, such as for example, a rate of 20 FPS, 60 FPS, 90 FPS, or the like (e.g., ±10%).

On Step 380, the AR framework may combine overlays from different skins to provide an output overlay. The output overlay may be displayed to the user, providing an augmented reality experience with augmentation over the frame viewed by the user. Additionally or alternatively, a label overlay may be generated by the AR framework and combined with the skin-generated overlays.

In some exemplary embodiments, the AR framework may add the overlay of each skin to the overlay as soon as the overlay is available. Additionally or alternatively, it may be useful to postpone adding an overlay in order to save processing time. A second skin may be registered on an object that is the output of the first skin. The second skin may change the objects that the first skin generated. Hence, there may be no need to draw the output of the first skin, and any computation time spent in adding it may be wasted.

In some exemplary embodiments, the metadata record which may be passed between the skins and the framework and potentially modified by the skins, may comprise privacy settings. The privacy settings may be settings of an object appearing in the frame or in the overlay display. As an example, the privacy settings may indicate whether the image may be retained, may be shared with other people, or the like. Privacy settings may be defined by the user, may be updated by the skins, may be updated by the AR framework in response to identification of a marker, or the like. In some cases, the AR framework may enforce the restrictions defined by the privacy settings. For example, if the privacy settings allow retaining and sharing of the frame, the frame may be retained and shared. Additionally or alternatively, the AR framework may combine the frame and display overlay for generating the AR view to be shared and retained for future use. If the privacy settings do not allow sharing of the frame, the frame itself may not be shared with others. Additionally or alternatively, if the privacy settings prevent the sharing or storage of specific objects in the frame, the AR framework may edit and redact portions of the frame, of the display overlay, combination thereof, or the like, based on the privacy settings.

On Step 390, the overlay display is displayed using the AR device. As a result, the overlay display is overlaid over the physical world, without combining the frame itself. In some exemplary embodiments, the overlay display is displayed by the AR glasses, providing personalized AR view of the world to the user. Additionally or alternatively, the AR device may be the windshield of a vehicle, providing a passenger of the vehicle with an augmented view of the surroundings of the vehicle. In other embodiments, the AR device may be located at any other location and/or device.

Figure 4A:
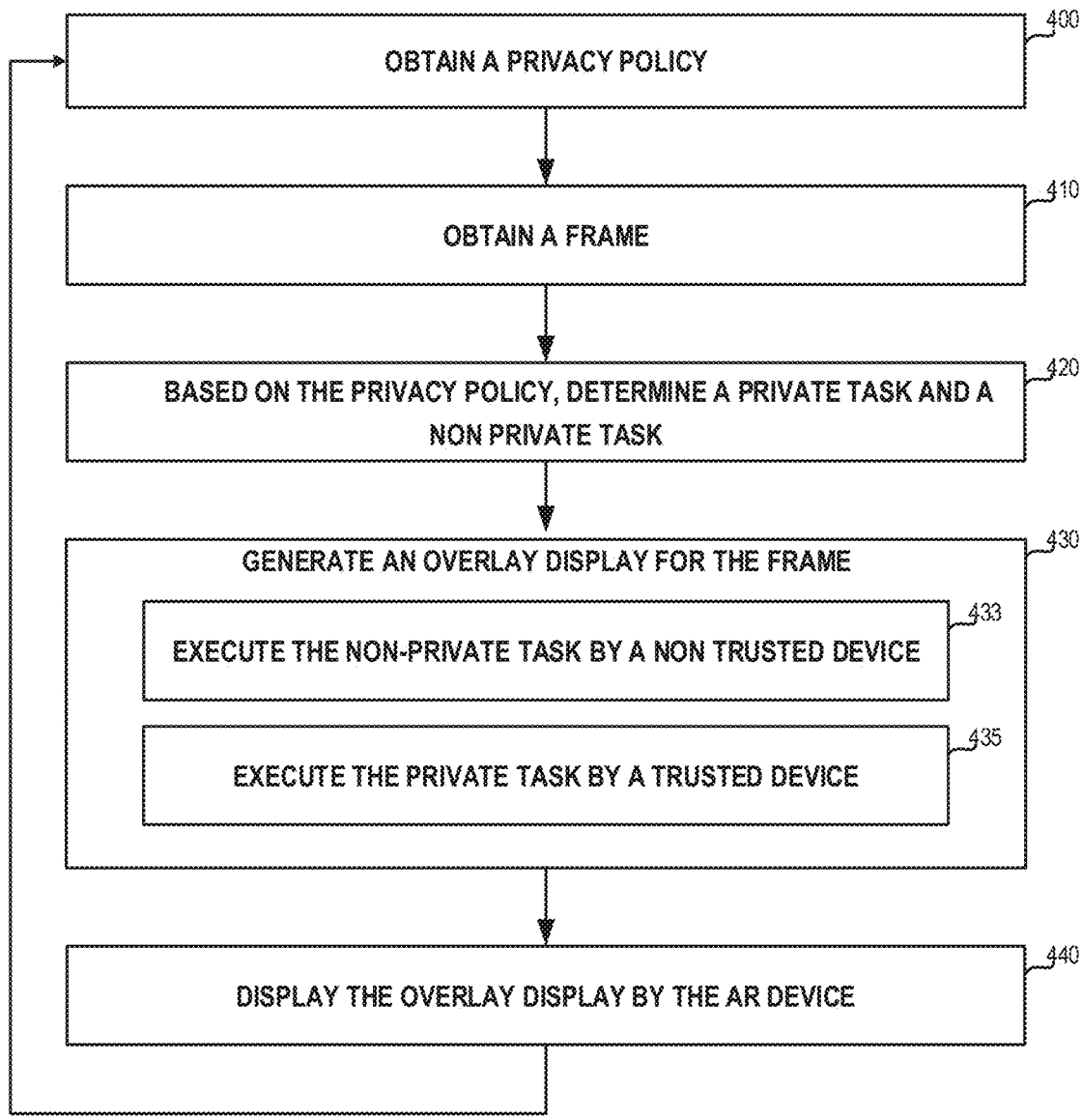
FIGS. 4A-4E show a flowchart diagram of a method, in accordance with some exemplary embodiments of the disclosed subject matter.

Referring now to FIG. 4A showing a flowchart diagram of a method, in accordance with some exemplary embodiments of the disclosed subject matter.

On Step 400, a privacy policy of a user may be obtained. The privacy policy may comprise instructions instructing on which computerized environment to execute the trusted task and on which computerized environment to execute the non trusted tasks. Additionally or alternatively, the privacy policy may define what tasks are private tasks, what tasks are non-private tasks, or the like. Additionally or alternatively, the privacy policy may define which devices are trusted devices, which devices are non-trusted devices, or the like. In some exemplary embodiments, it may desired to execute private tasks on trusted devices, non-private tasks on a non-trusted device, or the like. Additionally or alternatively, non-private tasks may be executed on any device that may be available in terms of computational resources. In some exemplary embodiments, the decision of which device to utilize to execute the non-private task may be based on an optimization of the resources available in the system, which include the trusted and non-trusted devices. Additionally or alternatively, the privacy policy may define what data is private, and what data is non-private. Additionally, or alternatively, the privacy policy may define networks that are private, networks that are non-private, or the like. As an example, the privacy policy may define that facial recognition is a private task. As another example, the privacy policy may define that the AR device are a trusted device, that a first cloud server is a trusted device and that a second cloud server is a non-trusted device. Additionally, or alternatively, the operation of the skin itself, its output, the functionality thereof, or the like may be the private data that is not to be disclosed. In some cases, a skin may declare that an output it provided is private.

In some exemplary embodiments, a trusted device for processing a private task may not be available. The device may not be available due to an overload on the device itself, due to an internet overload, or the like. The privacy policy may comprise instructions regarding the operation of the AR device in the absence of a trusted devices. As an example, in the absence of a trusted device, the AR device may pause the execution of the private task. Additionally, or alternatively, in the absence of a trusted device, the AR device may pause its operation until a trusted device is available.

In some exemplary embodiments, the privacy policy may define a privacy score that may be associated with a task. Additionally, or alternatively, the privacy policy may define a trust score that may be associated with each device that may execute tasks. In some exemplary embodiments, an AR device may be configured to execute a task associated with a privacy score on a device with a higher trust score than the privacy score.

In some exemplary embodiments, the privacy policy may comprise a privacy context. The privacy context may comprise data such as a location in which the privacy policy is valid, a duration in which the privacy policy is valid, other people that at their presence the privacy policy should be enforced, or the like.

In some exemplary embodiments, a user may wish to hide from a third party an execution of a skin at an AR device. Hence, the privacy policy may comprise that the skin on a trusted device.

On Step 410, a frame is obtained. The frame may be obtained from at least one frame sensor that is operationally coupled with an AR device. In some exemplary embodiments, a frame may be obtained every short period of time, e.g., every 90 milliseconds, every 60 milliseconds, every 50 milliseconds, every 30 milliseconds, or the like.

On Step 420, based on the privacy policy, a private task and a non-private task may be determined. In some exemplary embodiments, the private task may be a task comprising processing private data. Additionally, or alternatively, the private task may comprise sending private information. Additionally, or alternatively, the private task may comprise sending private information over a trusted network. Additionally, or alternatively, the private task may relate to an output of a skin, such as an output that was declared to be private.

On Step 430, an overlay display for the frame may be generated. In some exemplary embodiments, an overlay display may be based on execution of private and non-private tasks. Additionally or alternatively, an overlay display may comprise outputs of the private task, output of the non-private task, the original frame, a portion of the original frame, or the like. In some exemplary embodiments, the overlay display may be generated after performing Step 433, Step 435 or any combination thereof.

On Step 433, the non-private task may be executed by a non-trusted device.

On Step 435, the private task may be executed by a trusted device. In some exemplary embodiments, the trusted device may be the AR device. Additionally, or alternatively, the AR device may be a non-trusted device. As an example, a user may rent an AR device, borrow an AR device, or the like. The owner of the AR device may be able to obtain a portion of the data from the AR device. Hence, the AR device may not be considered as a trusted device. In some exemplary embodiments, an edge device may be a trusted device. The edge device may be a personal computer, a smart phone of the user, or the like. Additionally or alternatively, the edge device may be a non-trusted device. As an example, a user may rent a car. The car infotainment system may be the edge device. As the user has no control over the data that the car infotainment system may collect, the edge device may be a non-trusted device.

In some exemplary embodiments, in case that the private task comprises private data that should be sent to a trusted device, executing the private task by a trusted device may refer to sending the sensitive data to a trusted device.

In some exemplary embodiments, the non-private task may be configured to determine a high-resolution overlay of the frame. Additionally, or alternatively, the private task may be configured to determine a low-resolution overlay of the frame.

On Step 440, the overlay display may be displayed by the AR device to a user. In some exemplary embodiments, the overlay display may comprise the first overlay that is the output of the non-private task, the second overlay that is the output of the private task, or the like.

Steps 400-440 may be performed repeatedly, for a stream of frames. In some exemplary embodiments, Step 400 may be followed by Step 420. Once the privacy policy is obtained and the private task and the non-private task have been determined, Steps 430 and 440, may be repeated for a stream of frames.

It is noted that Step 435 may be executed prior to Step 433, in parallel to Step 433, or after Step 433.

Figure 4B:
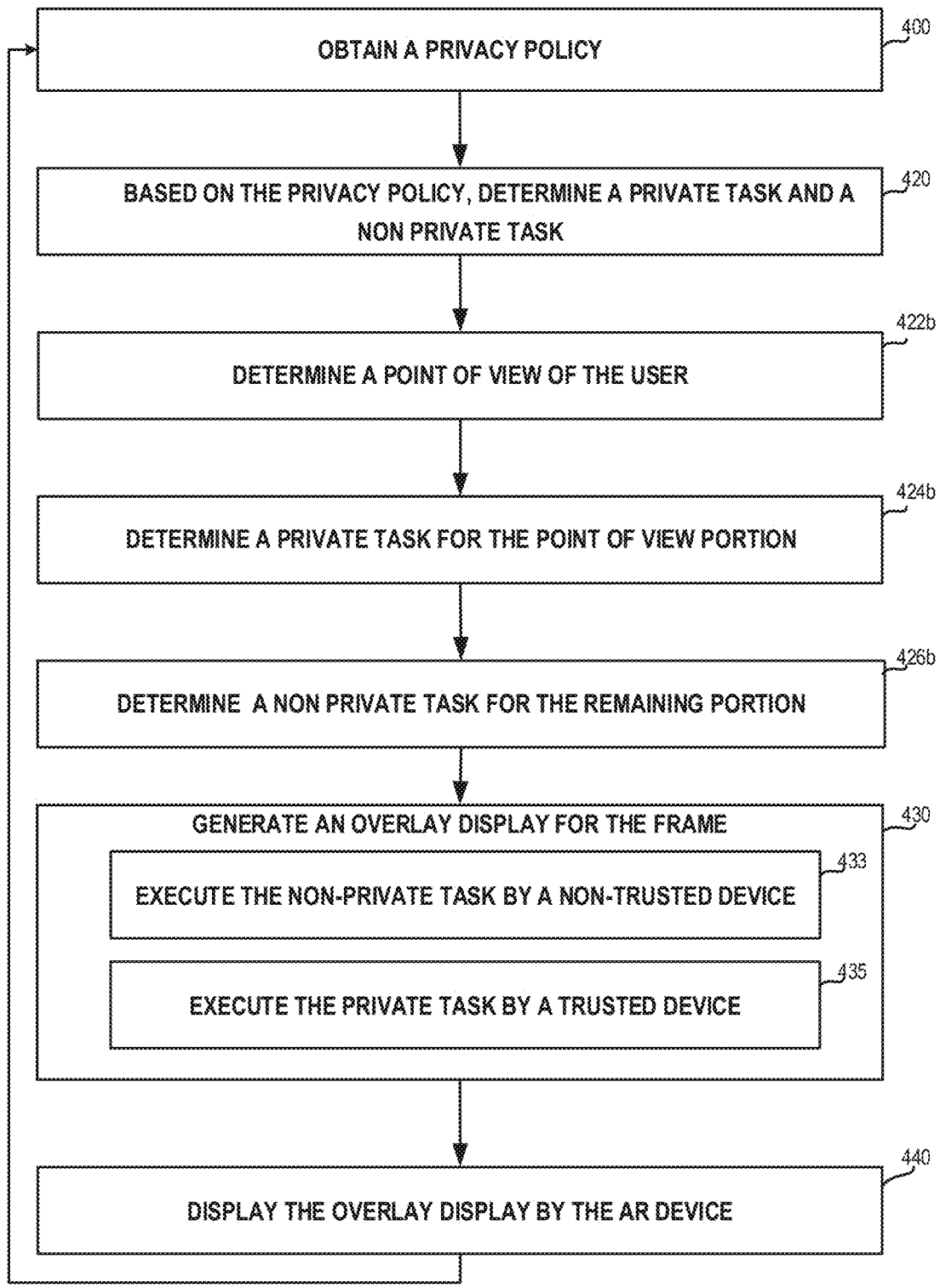

Referring now to FIG. 4B showing a flowchart diagram of a method, in accordance with some exemplary embodiments of the disclosed subject matter.

On Step 422b, information about a field of view of the user may be determined. In some exemplary embodiments, a point of fixation of the user may be determined. The point of fixation may be an area in the frame at which the user is looking. In some exemplary embodiments, it may be desired to hide images and objects that the user is fixating at from non-trusted devices. As an example, the user may be on a date, watching a show. The user may be staring at an actress' boozem, not paying any attention to the show. The user may wish to hide it from his date. In some exemplary embodiments, it may be desired to hide the point of fixation of a user from any device in order to minimize the ability of third parties to create a psychological profile of the user. In some exemplary embodiments, hiding the point of fixation of the user may harden advertisers to create focused profile of the user for purposes of advertisement optimizations.

On Step 424b, a private task may be determined for the point of fixation portion of the frame. Determining the private task may comprise determining a trusted device on which the private portion of the frame may be processed.

On Step 426b, a non-private task for the remaining portion may be determined. The remaining portion may include areas in the frame that are not the private portion. Determining the non-private task may comprise determining a non-trusted device by which the non-private portion may be processed.

Figure 4C:
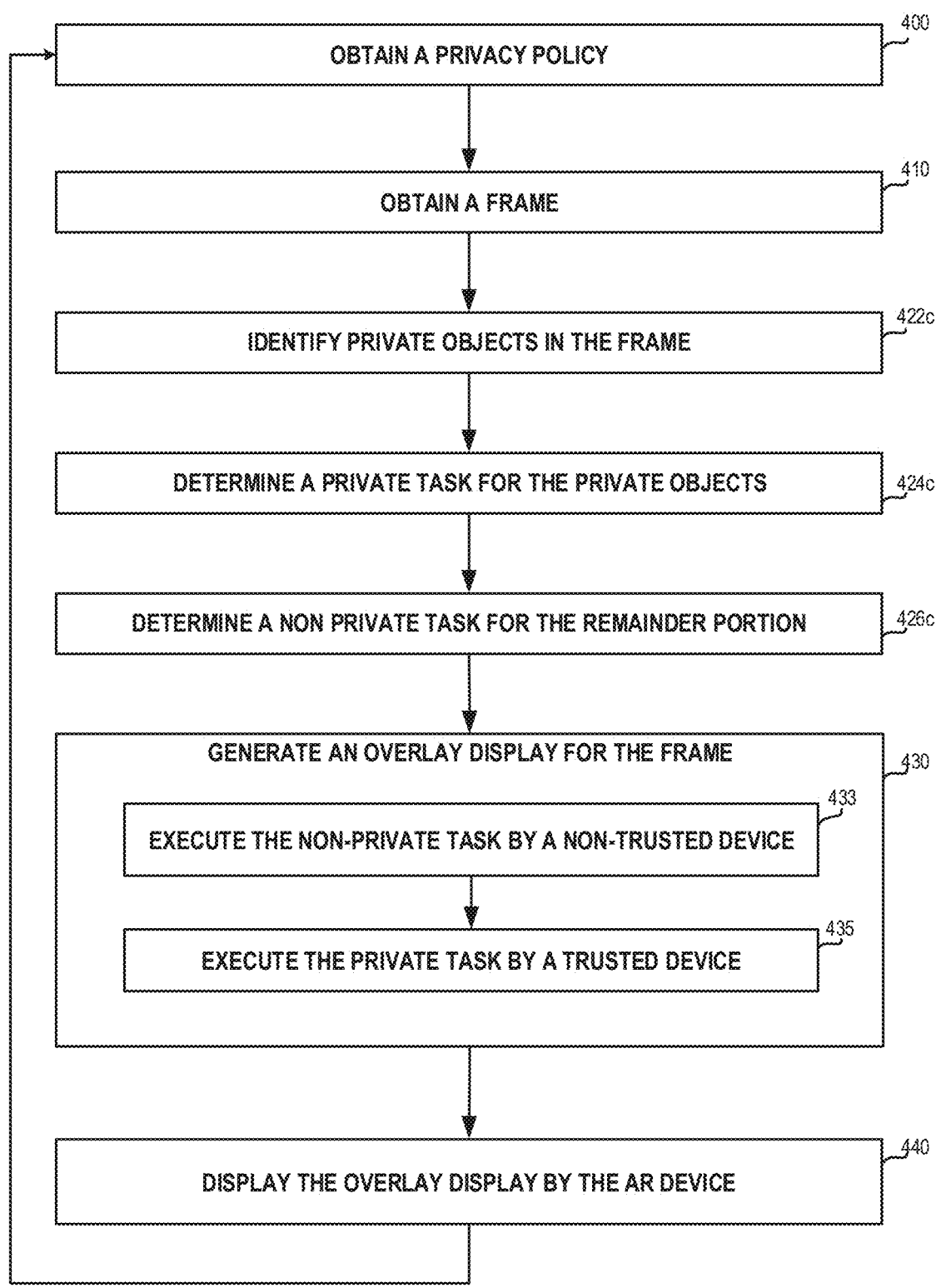

Referring now to FIG. 4C showing a flowchart diagram of a method, in accordance with some exemplary embodiments of the disclosed subject matter.

On Step 422c, private objects in the frame may be identified. In some exemplary embodiments, private objects may include objects that the user would prefer not to reveal to a third party. The user may not want that the third party will know with whom he is talking, his location, at what objects he is looking, or the like. As an example, the private objects may be faces of people, intimate body parts, a document having a "confidential" title, a screen showing source code of a program, or the like.

It is noted that in some exemplary embodiments, a skin that a user is using may be considered as private data. As an example, a user may pay for a skin that undresses people. Although a frame may not comprise private data the user may wish that the skin will be executed on a trusted device in order to not reveal that he is using the skin. Hence, executing the skin may be a private task.

In some exemplary embodiments, a user may wish to hide the fact that she utilizes a certain skin. The skin may be considered as a private information and the execution thereof may be a private task, to avoid revealing the user's usage of the private skin. As an example, the skin may be a dating skin, a skin that performs unethical operations, such as undressing bystanders, a skin that accesses non-legitimate data sources, such as dark web or illegal databases, or the like.

In some exemplary embodiments, the fact that the user utilizes a skin may be, generally, disclosable information. However, the specific configuration of the skin may be considered as private information. For example, the user may provide parameters to a skin that affect its operation. The user may wish to conceal the parameters. Additionally or alternatively, the user may wish to conceal some operation of the skin, such as when operating on a specific object, a specific type of object, or the like. Accordingly, execution of the skin may be considered as private tasks depending on the operation of the skin, on whether or not the parameters are provided to the execution environment, on whether the content of the parameters are reflected by the objects being processed, or the like. As an example, the user may configure a skin to operate on both minors and adults, and may wish to conceal the fact that the skin is being applied on minors. Hence, execution of the skin on an object representing an adult may be considered a non-private task, while execution of the skin on an object representing a minor may be considered as a private task. Additionally or alternatively, the application of a skin on a minor may be considered as a private task to avoid divulging information regarding minors to untrusted parties, such as information reflected from the frame or obtained by the skin when operating. As another example, the user may utilize a blocking skin that removes or otherwise redacts an image of a person from a frame. However, the user may wish to conceal from third parties the identity of the people being removed, e.g., her ex-boyfriend, a stalker, or the like.

In some exemplary embodiments, the AR framework may be configured to query a skin whether the skin is a private task or a non-private task. Additionally, or alternatively, as the privateness of the skins may change based on a frame, the framework may query the skin every second, every two seconds, every five seconds, or the like. Additionally, or alternatively, the framework may track objects and in response to identifying that there is a new object in the frame that the skin is registered on, the framework may query the skin whether executing the skin on that object is private task or non-private task.

On Step 424c, a private task for the private objects may be determined. The private task may comprise processing the private objects on a trusted device, sending the private object over a trusted network, or the like. As an example, a skin that is configured to perform facial recognition may be considered a private task in order to avoid sending faces of people to a non-trusted device. As another example, the private task may be to blur the confidential document.

On Step 426c, a non-private task for the reminder portion of the frame may be determined. The reminder portion may be areas in the frame that are private, that comprise private objects, or the like. The non-private task may comprise processing the non-private data on any device that is available, sending the data over any network, or the like.

Figure 4D:
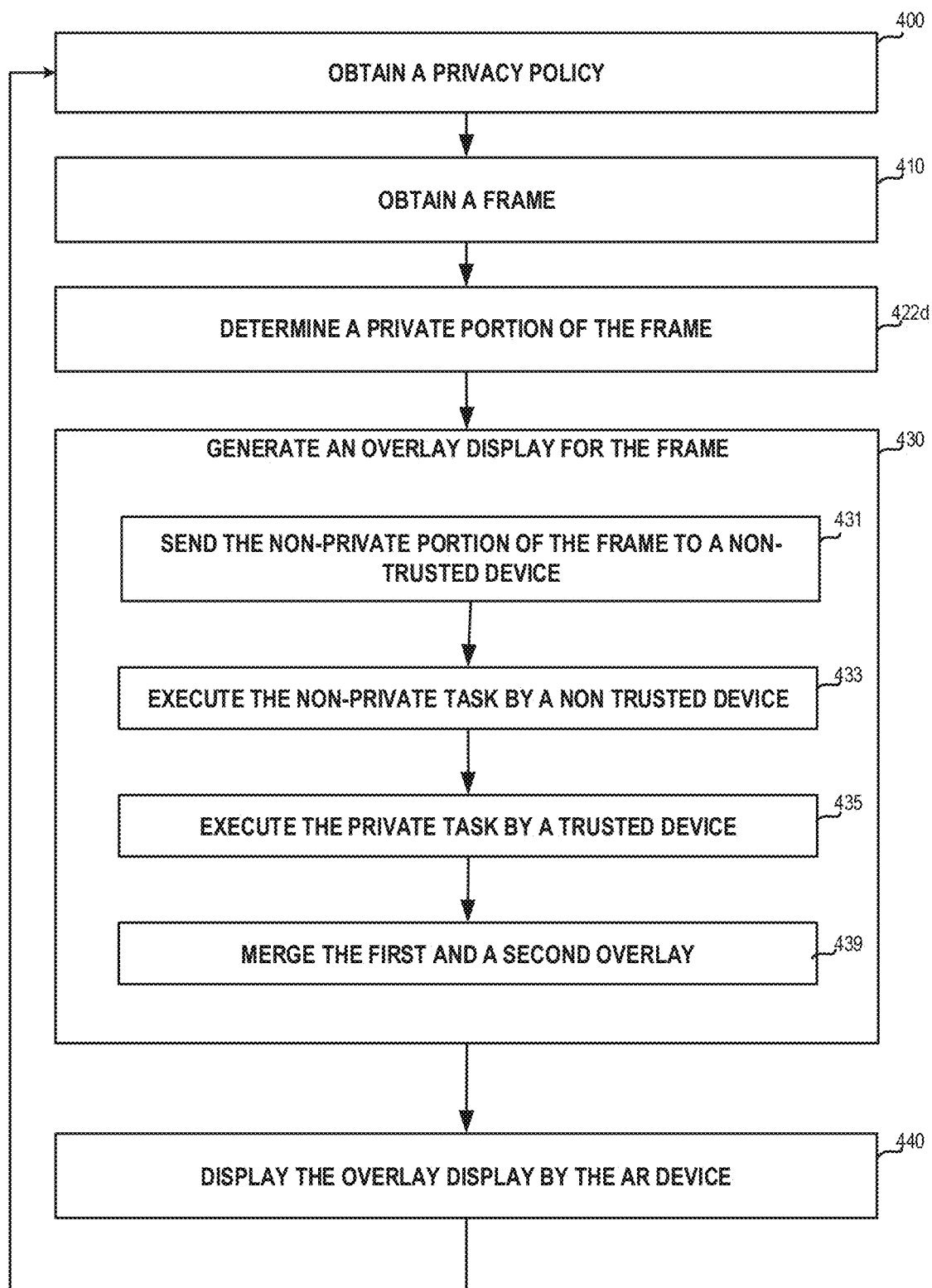

Referring now to FIG. 4D showing a flowchart diagram of a method, in accordance with some exemplary embodiments of the disclosed subject matter.

On Step 422d a private portion of the frame may be determined. In some exemplary embodiments, the private portion of the frame may be determined based on the content of the frame, such as comprising confidential objects, based on information embodied therein, or the like.

On Step 431, a non-private portion of the frame may be sent to a non-trusted device. The non-private portion may be the frame without the private portion. The non-trusted device may be an edge computer, a cloud server, or the like.

On Step 435, the non-private task may be executed by the non-private device in order to determine a first overlay. The first overlay may be the output of the non-private task, such as the output of a skin.

On Step 435, the private task may be executed by a trusted device in order to determine the second overlay. In some exemplary embodiments, the AR device may be the trusted device. As the private task may comprise processing a portion of the frame comprising an object that the user is looking at, it may be desired to avoid sending that portion to a non-trusted device.

It is noted that the non-private task and the private task may comprise invoking the same skin on different portions of the frame.

On Step 439, the first and second overlays may be merged after being received from the trusted device and non-private device, respectively.

Figure 4E:
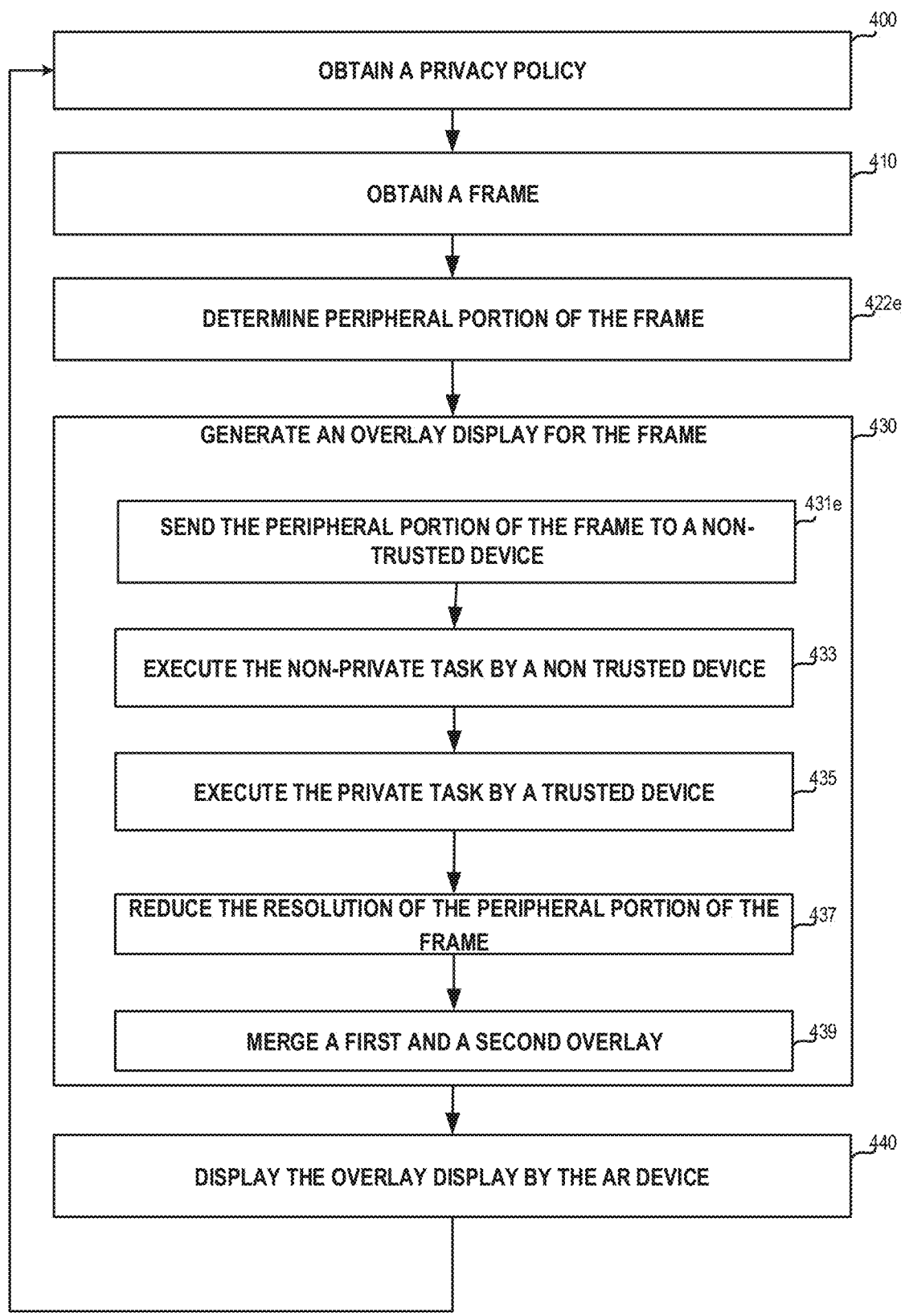

Referring now to FIG. 4E, showing a flowchart diagram of a method, in accordance with some exemplary embodiments of the disclosed subject matter.

On Step 422e, a peripheral portion of the frame may be determined. In some exemplary embodiments, the peripheral portion of the frame may a portion that is sensed by the user's peripheral vision. The frame may be divided to peripheral portion and non-peripheral portion. In some exemplary embodiments, the non-peripheral portion of the frame may be an area in the frame corresponding to the area on which the user is looking. Identifying a direction to where the user is looking within the frame may be performed using a camera coupled with the AR device, an IR camera coupled with the AR device, or the like. In some exemplary embodiments, the non-peripheral portion of the frame may be a private portion of the frame. As an example, a user may wish that an AR framework will process areas on which he as looking as a private portion of the frame. In some exemplary embodiments, processing areas of the frame as private tasks may comprise not sending the private areas to a non-trusted device, sending the private areas over a trusted network, or the like. In some cases, peripheral portions of frames may be processed differently, such as in a lower resolution to conserve resources.

On Step 431e, the peripheral portion of the frame may be sent to a non-trusted device. Step 431e may be performed similarly to Step 431 of FIG. 4A.

On Step 437, the resolution of the peripheral portion of the frame may be reduced, yielding power saving while not compromising the privacy of the user. Additionally or alternatively, the resolution of the first overlay may be reduced. Additionally or alternatively, a user may be indifferent to reducing the resolution of the peripheral areas of the frame due to the peripheral areas being sensed by the user's peripheral vision.

Figure 5:
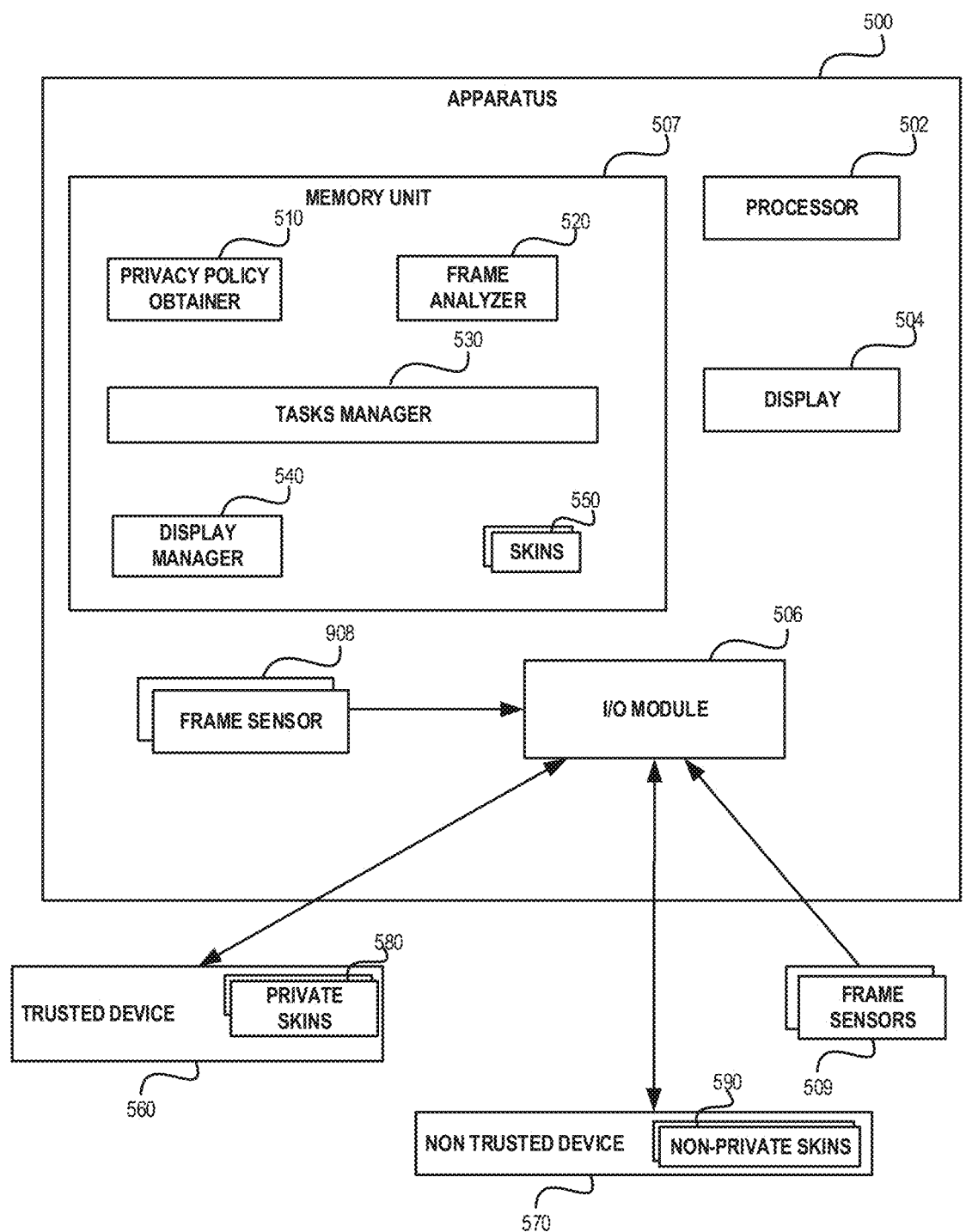
FIG. 5 shows an apparatus, in accordance with some exemplary embodiments of the disclosed subject matter.

Referring now to FIG. 5 showing an apparatus, in accordance with some exemplary embodiments of the disclosed subject matter.

In some exemplary embodiments, Apparatus 500 may comprise Processor 502. Processor 502 may be a Central Processing Unit (CPU), a microprocessor, an electronic circuit, an Integrated Circuit (IC) or the like. Additionally or alternatively, Apparatus 500 can be implemented as firmware written for or ported to a specific processor such as Digital Signal Processor (DSP) or microcontrollers, or can be implemented as hardware or configurable hardware such as Field Programmable Gate Array (FPGA) or Application Specific Integrated Circuit (ASIC). Processor 502 may be utilized to perform computations required by Apparatus 500 or any of its subcomponents.

In some exemplary embodiments, Processor 502 may be configured to determine a trust score for an external computerized environment. The external computerized environment may be an edge device, a cloud server, or the like. In some exemplary embodiments, a privacy score may be associated with a frame. Processor 502 may be configured to process a frame on an external device that has a trust score that is equal to or greater that the privacy score of the frame. Additionally, or alternatively, Processor 502 may be configured to execute a private task on an external device that a trust score above a predetermined value. Additionally, or alternatively, a task may have a privacy score. Processor 502 may be configured to execute a task on an external device if the trust score of the device is greater than or equal to the privacy score of the task.

In some exemplary embodiments, based on the trust score and on the privacy policy, Processor 502 may be configured to determine a first set of skins as private skins. The private skins may be applied on frames by a first external device having a trust score above a threshold. Additionally, or alternatively, Processor 502 may be configured to determine a second skins as non-private skins. The non-private skins may be applied on frames by a second external device having a trust score that is below the threshold.

In some exemplary embodiments, Apparatus 500 may comprise a Display 504. Display 504 may display augmented images to a user. The augmented images may be the result of frames captured by Frame Sensor 508, 509 and processed by the apparatus.

In some exemplary embodiments, Apparatus 500 may comprise a Frame Sensor 508. In some exemplary embodiments, Frame Sensor 508 may be an integral part of an augmented reality glasses worn by the use.

In some exemplary embodiments, Apparatus 500 may comprise a Frame Sensor 509. Frame Sensor 509 may be external to Apparatus 500.

In some exemplary embodiments, Apparatus 500 may comprise an I/O Module 506. Apparatus 500 may utilize I/O Module 506 as an interface to transmit and/or receive information and instructions between Apparatus 500 and external I/O devices such as, Trusted Device 560, Non-Trusted Device 570, Frame Sensors 509, or the like. Additionally, or alternatively, I/O Module 506 may be used by Apparatus 500 in order to send frames to Trusted Device 560, to Non-Trusted Device 570, or the like. Additionally, or alternatively, I/O Module 506 may be utilized in order to obtain overlays from Trusted Device 560, from Non-Trusted Device 570, or the like.

In some exemplary embodiments, Trusted Device 560 may be connected to Apparatus 500. Apparatus 500 may utilize Trusted Device 560 in order to invoke skins thereon, in order to execute a private task thereby, or the like. Executing a private task on Trusted Device 560 may yield power saving compared to executing the private task locally, on Apparatus 500.

In some exemplary embodiments, Non-Trusted Device 570 may be a remote cloud server. I/O Module 506 may be connected to Non-Trusted Device 570 via a Wide Area Network (WAN) such as the Internet. Additionally, or alternatively, I/O Module 506 may connect with Non-Trusted Device 570 via Edge 560. Apparatus 500 may utilize Non-Trusted Device 570 in order to invoke skins thereon.

In some exemplary embodiments, Apparatus 500 may comprise a Memory Unit 507. Memory Unit 507 may be persistent or volatile. For example, Memory Unit 507 can be a Flash disk, a Random Access Memory (RAM), a memory chip, an optical storage device such as a CD, a DVD, or a laser disk; a magnetic storage device such as a tape, a hard disk, Storage Area Network (SAN), a Network Attached Storage (NAS), or the like; a semiconductor storage device such as Flash device, memory stick, or the like. In some exemplary embodiments, Memory Unit 507 may retain program code to activate Processor 502 to perform acts associated with any of the steps shown in FIG. 4A-4E. In some exemplary embodiments, Memory Unit 507 may be configured to retain a privacy policy of a user of the apparatus.

In some exemplary embodiments, Skins 550 may be executed locally in Memory Unit 507 or remotely on a computerized environment such as Trusted Device 560, Non-Trusted device 570, or the like. In some exemplary embodiments, Apparatus 500 may be configured to decide whether a skin is to be executed on a non-trusted device or on a trusted device based on a privacy policy. As an example, a user may be in a private meeting, not wishing that data regarding the meeting is processed remotely.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Apparatus 500 may comprise a Privacy Policy Obtainer 510. Privacy Policy Obtainer may obtain a privacy policy from a remote cloud server. Apparatus 500 may be configured to decide where to execute Skins 550, Private Skins 580, non-private Skins 590 based on the privacy policy.

In some exemplary embodiments, Apparatus 500 may comprise a Frame Analyzer 520. Frame Analyzer 520 may be configured to analyze frames in order to determine a private portion of the frame. Additionally, or alternatively, Frame Analyzer 520 may be configured to determine a private object therein. A private portion of the frame, based on the privacy policy, may be a portion displaying a face of a person, intimate body parts, private or confidential objects such as documents, a person's belongings, or the like. Additionally, or alternatively, Frame Analyzer 520 may be configured to analyze frames in order to determine a point of fixation of the user.

In some exemplary embodiments, Apparatus 500 may comprise a Tasks Manager 530. Tasks Manager 530 may be configured generate a private task, to generate a non-private task, or the like. Additionally, or alternatively, Tasks Manager 530 may be configured to determine a private skin from Skins 550 and to execute the skin by Trusted Device 560. Additionally, or alternatively, Tasks Manager may be configured to determine a non-private skin from Skins 550 and execute it by Non-Trusted Device 570. In some exemplary embodiments, Trusted Device 560 may hold and execute Private Skins 580. Additionally, or alternatively, Non Trusted 570 may hold and execute Non Private Skins 590. Private Skins 580 and Non-Private Skins 590 may run regardless with the operation of Apparatus 500. Executing the private task may comprise sending private data to the private skin and obtaining a second overlay therefrom. The private data may comprise a private portion of the frame, a private object, or the like. Additionally, or alternatively, executing the non-private task may comprise sending a non-private portion of the frame to Non Private Device 590 and obtaining the first overlay.

In some exemplary embodiments, Apparatus 500 may comprise a Display Manager 540. Display Manager 540 may be configured to obtain a first overlay. Additionally, or alternatively, Display Manager may be configured to obtain a second overlay. Display manager may be configured to merge the first and the second overlay to form the overlay display and to provide the overlay display to Display 504. Additionally, or alternatively, Display Manager may be configured to provide the first overlay, the second overlay, or the like to Display 504. In some exemplary embodiments, Display Manager 540 may be configured to reduce the resolution of the first overlay prior to providing the first overlay to Display 504, prior to forming the overlay display, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a privacy policy of a user, wherein the user is using an Augmented Reality (AR) device;
   obtaining a frame from at least one frame sensor;
   generating an overlay display for the frame, wherein said generating is based on an execution of a non-private task on a non-trusted device and based on an execution of a private task on a trusted device, wherein the private task and the non-private task are determined based on the privacy policy; and
   displaying, by the AR device, the overlay display.

2. The method of claim 1, further comprises:
   determining a private portion of the frame, whereby dividing the frame to the private portion and a non-private portion;
   wherein the execution of the non-private task comprises processing the non-private portion of the frame, whereby obtaining a first overlay;
   wherein the execution of the private task comprises processing the private portion of the frame, whereby obtaining a second overlay;
   wherein said generating the overlay display further comprises: merging the first overlay and the second overlay to obtain the overly display.

3. The method of claim 2, wherein said determining the private portion of the frame is based on a point of fixation of the user, wherein the non-trusted device is unable to ascertain the point of fixation of the user from the non-private portion.

4. The method of claim 2, wherein said determining the private portion of the frame is based on an identification of Personally Identifiable Information (PII) appearing in the frame.

5. The method of claim 4, wherein the PII comprises visible facial features of a person, whereby the non-private portion excludes the visible facial features.

6. The method of claim 1 further comprises
   determining a peripheral portion of the frame based on a point of fixation of the user;
   wherein the non-private task is configured to determine a high-resolution overlay of the frame;
   wherein the private task is configured to obtain a low-resolution overlay of the peripheral portion of the frame; and
   wherein the overlay display for the frame comprises the low-resolution overlay of the peripheral portion of the frame and at least a portion of the high-resolution overlay of the frame.

7. The method of claim 1, wherein the trusted device comprises the AR device, wherein the non-trusted device comprises an external device, external to the AR device.

8. The method of claim 1, wherein the trusted device comprises a trusted server, wherein the non-trusted device comprises a non-trusted server.

9. The method of claim 1, wherein the non-trusted device comprises the AR device.

10. The method of claim 1, wherein the execution of the private task comprises:
    analyzing the frame to determine a private portion of the frame and a non-private portion of the frame; and
    providing the non-private portion of the frame to the non-trusted device, whereby the non-trusted device performing the execution of the non-private task with respect to the non-private portion of the frame.

11. The method of claim 1, wherein the execution of the private task further comprises:
    obtaining a first overlay from the non-trusted device, wherein the first overlay is generated by the execution of the non-private task;
    executing one or more skins on the private portion of the frame, whereby generating a second overlay; and
    merging the first overlay with the second overlay, whereby generating the overlay display.

12. The method of claim 11,
    wherein the overlay display is determined by applying skins on the frame or a portion thereof;
    based on the privacy policy, identifying, in the skins, one or more private skins and one or more non-private skins;
    wherein the execution of the non-private task comprises applying the one or more non-private skins, whereby obtaining a first overlay; and
    wherein the execution of the private task comprises applying the one or more private skins, whereby obtaining a second overlay;
    wherein said generating further comprises combining the first overlay and the second overlay, whereby generating the overlay display.

13. The method of claim 12, wherein the execution of the non-private task further comprises applying the one or more redundant skins, wherein the private task comprises ignoring output of the one or more redundant skins.

14. The method of claim 12, wherein said applying the one or more private skins is performed on a first object in the frame, wherein the execution of the non-private task comprises applying the one or more private skins on a second object in the frame.

15. An apparatus comprising: a processor and a coupled memory, wherein the processor is configured to
obtain a privacy policy of a user, wherein the user is using an Augmented Reality (AR) device;
obtain a frame from at least one frame sensor;
generate an overlay display for the frame, wherein the overlay display is generated based on an execution of a non-private task on a non-trusted device and based on an execution of a private task on a trusted device, wherein the private task and the non-private task are determined based on the privacy policy; and
display, by the AR device, the overlay display.

16. The apparatus of claim 15, wherein the apparatus comprises the AR device.

17. The apparatus of claim 15, wherein the processor is further configured to:
determine a private portion of the frame, whereby dividing the frame to the private portion and a non-private portion;
wherein the execution of the non-private task comprises processing the non-private portion of the frame, whereby obtaining a first overlay;
wherein the execution of the private task comprises processing the private portion of the frame, whereby obtaining a second overlay;
wherein the overlay display is generated by merging the first overlay and the second overlay.

18. The apparatus of claim 15, wherein the execution of the private task comprises:
analyzing the frame to determine a private portion of the frame and a non-private portion of the frame; and
providing the non-private portion of the frame to the non-trusted device, whereby the non-trusted device performing the execution of the non-private task with respect to the non-private portion of the frame.

19. A computer program product comprising non-transitory computer readable medium retaining instructions, which instructions when executed by a processor, cause the processor to:
obtain a privacy policy of a user, wherein the user is using an Augmented Reality (AR) device;
obtain a frame from at least one frame sensor;
generate an overlay display for the frame, wherein the generation of the overlay display is based on an execution of a non-private task on a non-trusted device and based on an execution of a private task on a trusted device, wherein the private task and the non-private task are determined based on the privacy policy; and
display, by the AR device, the overlay display.

* * * * *